United States Patent [19]

Lundberg et al.

[11] 4,053,548
[45] Oct. 11, 1977

[54] FABRICATION PROCESS FOR MULTIPHASED PLASTICS

[75] Inventors: Robert D. Lundberg, Somerville; Henry S. Makowski, Scotch Plains, both of N.J.

[73] Assignee: Exxon Research & Engineering Co., Linden, N.J.

[21] Appl. No.: 199,799

[22] Filed: Nov. 17, 1971

[51] Int. Cl.² ............... B29B 3/02; B29C 25/00
[52] U.S. Cl. ............... 264/230; 260/857 R; 260/886; 264/237; 264/294; 264/296
[58] Field of Search ............ 264/294, 296, 171, 176 F, 264/92, 322, 288, 230, DIG. 47, 237; 260/857 R, 886

[56] References Cited

U.S. PATENT DOCUMENTS

| | | | |
|---|---|---|---|
| 3,386,877 | 6/1968 | Skochdopole et al. | 264/321 |
| 3,526,683 | 9/1970 | Heslop et al. | 264/230 |
| 3,544,671 | 12/1970 | Sandiford | 264/288 |
| 3,548,048 | 12/1970 | Hughes et al. | 264/DIG. 47 |
| 3,597,498 | 8/1971 | Christensen | 264/171 |
| 3,655,829 | 4/1972 | Ronzoni et al. | 264/171 |
| 3,673,295 | 6/1972 | Winchlhofer et al. | 264/92 |

*Primary Examiner*—Jeffery R. Thurlow
*Attorney, Agent, or Firm*—E. J. Fanning; R. E. Nanfeldt

[57] ABSTRACT

A process for fabricating a plastic, which plastic is either a thermoplastic ionomer or a multiphase graft or block copolymer of the ABA,

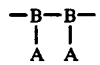

or $(AB)_n$ wherein $n$ is greater than 1 and wherein the polymer blocks (A and B) are thermoplastic, incompatible with one another, and have different softening points, both softening points being substantially above room temperature when using the latter class of polymers. The material is first heated to a temperature above both softening points and formed into any desired shape, then cooled and re-formed into a new desired shape at a temperature between that of the softening points of the two blocks and finally cooled to a temperature below both softening points thereby retaining the shape last achieved. When using thermoplastic ionomers the process is similar. The material is heated above the softening point of the thermoplastic backbone and plasticizers are employed to disrupt the ionic domains. The process may be readily employed to prepare containers, bottles, or rigid foams and the like which may be shipped as compact materials and re-formed for actual use by simply reheating, etc.

7 Claims, No Drawings

FABRICATION PROCESS FOR MULTIPHASED PLASTICS

BACKGROUND OF THE INVENTION

The instant invention is directed to a process for fabricating articles (e.g. bottles, stamped plastic sheets, rigid foams, etc.) from specific thermoplastic compositions. These compositions are either multiphase resinous copolymers having certain critical characteristics or specific ionomeric polymers (ionomers) as more fully described hereafter. This fabrication process allows production of articles which, on simple heating, change their shapes to form a predetermined new configuration. Thus, for example, a sheet or compacted slab of material prepared by this novel process can be simply heated by the ultimate user to form a container or a rigid foam without the necessity for him to employ costly molds, etc.

It is known that crystalline and semicrystalline polyethylene and copolymers thereof with propylene may be used to prepare fabricated articles by a process in which the polyethylene is formed as a molded object, permanently crosslinked by either chemical means or by irradiation, then heated to about 140° C. and collapsed and cooled. Reheating to the temperature at which the object collapsed restores the original shape. See U.S. Pat. No. 3,563,973 and 3,526,683. While that fabrication process has obvious advantages there are also several serious disadvantages. Both chemical and radiation crosslinking are expensive operations and increase the cost of the final product. Further, crosslinking is irreversible, i.e., once polyethylene is crosslinked, it cannot be returned to the uncrosslinked state. Therefore, it is impossible to reuse scrap. Since the process is limited to only polyethylene and certain of its copolymers, strict limitations are placed on applicability of the final product. For example, certain critical temperatures must not be exceeded, etc. By contrast, the process of the instant invention employing the thermoplastic compositions more fully described hereafter achieves all the advantages of the above-described prior art process and avoids all of the disadvantages attendant thereto.

French Pat. No. 1,576,598 broadly discloses multiphase polymers which may be random, block or graft copolymers wherein either both monomers would produce a resinous homopolymer or one would produce a resinous and one an elastomeric homopolymer. For purposes of the instant invention, it has been discovered that random copolymers and copolymers wherein any monomer unit would produce an elastomeric polymer are not applicable. In fact, the only polymers applicable to the instant invention are either thermoplastic ionomers as more fully described hereafter, or graft or block copolymers falling within the following general structural formulae:

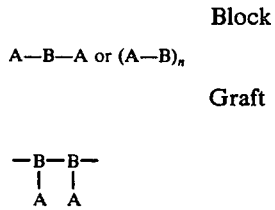

wherein $n$ is greater than 1 (i.e., two block systems are not suitable) and wherein polymer blocks A and B are each thermoplastic resins having different softening points (i.e., differing from one another by at least 10°, preferably by at least 20°, and most preferably by 50°–100° C.), wherein B is the lower softening block and is present in from about 50 to as high as about 97 wt. % of total polymer, more preferably about 50 to about 90 wt. %. In order that distinct phases to present in the copolymer, each polymer block should contain at least about 10 and preferably 50 or more monomeric units. It is also noted that B must be an interior block in a block copolymer or form the backbone in a graft copolymer in order to function in the instant invention. Further, the softening point of each block must be substantially above room temperature (25° C.), i.e., at least about 10° C. above. Therefore, the lower softening block should have a softening point of at least 35° C., and should, for practical purposes, not exceed about 260° C., although, of course, higher softening points are also applicable. Preferably, the softening point of the lower softening block should be at least about 50° C. to about 150° C.

By softening point is meant either the crystalline melting point or the glass transition temperature of the polymer block.

Methods of preparing block and graft copolymers are well known and need not be recited here. In order to determine suitable monomeric constituents for a block or graft copolymer as described above, one need only determine the softening points of the homopolymers produced from these monomers and having the appropriate number of monomeric units. A blend of mixture of these homopolymers must also exist in separate distinct phases at ambient temperatures in order to insure that a copolymer prepared from selected monomeric constituents would be multiphase and useful in the instant invention.

Although these polymer blocks can best be prepared by direct polymerization techniques, these various blocks can be suitably modified by plasticization to change the softening points of the respective blocks as long as the resulting product is a multiphase product, each phase of which obeys the softening point criteria described above.

Representative examples of copolymers which are suitable for use in the instant invention provided they fall within the above-defined general formulae are: poly t-butylstyrene-polystyrene, polychlorostyrene-polystyrene, polycaprolactam-polystyrene, polycaprolactone-polystyrene, polyamides, i.e.(hexamethylene diamine-adipic acid copolymers or Nylon 6,6)-polystyrene, polypropylene-polyethylene, polybutene-1-polypropylene, polyethylene-poly 4-methylpentene-1, polymethacrylonitrile-polystyrene, polymethacrylonitrile-polyethylene oxide, polyethyleneterephthalate-polyphenylhydroxyether of bisphenol A, polyphenylhydroxyether of bisphenol A-polysulfone (from bisphenol A and dichloro diphenyl sulfone).

Preferable copolymers include: poly t-butylstyrenepolystyrene of the ABA type, crystalline polypropylene-polyethylene copolymers of the ABA type, etc.

The preparative teachniques for each of these polymer blocks is well described (see *Preparative Techniques of Polymer Chemistry;* Sorenson and Campbell, Interscience Publishers, 1968) and the means of combining these various blocks with each other is now well-known in the polymer art.

As mentioned previously, specific ionomeric polymers or ionomers are also applicable in the instant invention. These useful ionomers may be structurally defined as polymers having a backbone composed of a thermoplastic resin and having side chains or groups pendent to that backbone which groups are sufficiently polar so as to have the capability of forming ionic domains (i.e., the capability to associate with one another so as to form "physical crosslinks"). For convenience these polymers are referred to as thermoplastic ionomers.

Ionomeric polymers such as those employed in the instant invention are normally prepared by attaching acid groups to the polymer and then neutralizing the acid moiety with basic metal compounds (e.g., metal hydroxides, metal salts, etc.) or basic nitrogen compounds (ie., ammonia, amines, etc.) to ionically link the polymers. Preferably, the metal ions employed are alkali metals or alkaline earth metals. The acid group may be introduced into the polymer chain in a variety of ways. One way is by introducing acid groups on the predominant polymer, e.g., sulfonating polystyrene. Another way is by copolymerizing an alpha, beta-ethylenically unsaturated acid monomer with the predominant monomer, or by graft-polymerizing an alpha, beta-ethylenically unsaturated acid moiety on the predominant polymer.

Typical examples of ionomers employing salts of carboxylic acid type pendent groups are disclosed in British Pat. 1,011,981; U.S. Pat. Nos. 3,264,272; 3,322,734; 3,338,734; 3,355,319; 3,522,222; and 3,522,223. Typical examples of ionomers employing phosphonate-type pendent groups include those disclosed in U.S. Pat. Nos. 3,094,144; 2,764,563, 3,097,194; and 3,255,130.

Typical examples of ionomers employing sulfonate-type pendent groups include those disclosed in U.S. Pat. Nos. 2,714,605; 3,072,618; and 3,205,285. The techniques disclosed in these references may be employed to prepare the thermoplastic ionomers of the instant invention. The thermoplastic resin used as the backbone must meet the same requirements as to softening point as the lower softening block in the previously described block and graft copolymers and any thermoplastic resin which may be suitably modified to meet these criteria is applicable. The polar groups pendent to the thermoplastic backbone should be present in from at least about 0.2 to about as high as 15 mole % (i.e., 0.2–15 moles per mole of monomer repeating unit), preferably 0.5 to 10 mole % of the total polymer.

Typical representative examples of thermoplastic ionomers useful in the instant invention include sulfonated polystyrene, sulfonated poly-tertiary butylstyrene, sulfonated polymethylstyrene, sulfonated polyethylene, sulfonated polypropylene, sulfonated polybutene-1, sulfonated styrene/methyl methacrylate copolymers, sulfonated styrene/acrylonitrile copolymers, methacrylonitrile copolymers, sulfonated polyformaldehyde and copolymers, sulfonated polyvinylchloride, sulfonated block copolymers of polyethylene oxide and polystyrene, acrylic acid copolymers with styrene, acrylic acid copolymers with methyl methacrylate. Preferably, the thermoplastic ionomer will be sulfonated polystyrene or sulfonated polyethylene and its copolymers. It should be apparent that in addition to direct sulfonation of these polymers or copolymers, a very convenient technique for incorporating a proper amount of sulfonate salt in these polymers is simply to copolymerize a suitable diene or difunctional molecule at a modest level (0.5 to 10%) with the desired monomer. For example, the copolymerization of 2 to 5 weight percent of ethylidene norbornene with ethylene using coordination catalysts provides a polyethylene with a small amount of unsaturation, yet the high crystallinity of polyethylene is still maintained. Direct sulfonation of the residual unsaturation provides a "sulfonated polyethylene" having excellent properties for the fabrication process of this invention. The same approach can be taken with nearly all of the polymers suggested above.

When the graft or block copolymers heretofore described are employed in the instant invention the process for fabricating the final article comprises the following steps. The multiphase copolymer is first heated to a temperature above the softening point of both polymer blocks. Preferably, this temperature should be at least 10° C., and most preferably at least about 20° C., above that of the softening point of the higher softening block. At this temperature the copolymer is in a molten state and may be readily molded to any desired form. Thus, for example, the composition may be foamed, pressed into a sheet, blow molded to form a container such as a bottle, etc. After the article has been formed in the desired shape it is then cooled to a temperature between that of the softening point of the A and B blocks and re-formed to a second desired shape. For example, if the first desired shape is a rigid foam the second desired shape may be a flat sheet. After the article is reformed in the second desired shape it is cooled to a temperature below both softening points while retaining this new desired shape. At any later time the re-formed article may be reheated to a temperature between the softening points of the A and B blocks and at this temperature will regain the first desired shape. For example, a sheet may be reheated to this temperature and expand to a rigid foam which was the first desired shape.

Another example of the applicability of this process is as follows. The thermoplastic composition is heated to a temperature above both softening points formed as a plastic sheet and cooled immediately to a temperature below both with softening points. The sheet thus formed may be stored indefinitely and will retain its shape. At a later time the sheet may be reheated to a temperature between that of the softening points of the A and B blocks, stamped at that temperature with any desired design, and then cooled again to a temperature below both softening points thereby attaining a stamped plastic sheet.

One area of considerable potential for this invention relates to the use of reinforced plastics, preferably in a stamping operation. The use of reinforced plastic sheet is well-known. Glass reinforced polypropylene, containing 30 to 40% glass has been used in a stamping operation by heating the composite to a temperature above the melting point of polypropylenes, and then vacuum forming, molding, or stamping the composite into the required shape, cooling to retain dimensional stability and ejecting the part. Such a process is considered to be usable in conventional metal stamping operations. There are, however, disadvantages associated with such composites, i.e., if heated reinforced sheets are stacked at high temperature they can flow and adhere to each other. Also, the fabrication process must be conducted at a rather well-defined temperature; if too cool fabrication will not proceed; if too hot the sheet will lose its limited dimensional stability. With the compositions described in this application, the desirable handling characteristics are retained over a broader temperature range, and dimensional stability is much less temperature sensitive. Furthermore, it is within the scope of the process of this invention that a glass reinforced sheet be extruded by conventional thermoplastic means above the softening points of both phases (or in the presence of suitable plasticizers if ionic phases are present) and cooled to an intermediate temperature above the softening temperature of the lower softening phase, and simply rolled into a suitable shape for shipping (as is now done with metal sheet) followed by cooling to ambient temperature. Such a roll will be convenient to ship or store; to use, merely reheating the roll to a temperature above the lower softening phase will provide a "rubbery" sheet which can be unrolled and stamped or fabricated at will, followed by a cooling step to provide the final fabricated part.

Alternatively, this process lends itself nicely to the preparation of shrink type films often used in packaging applications. Thus, the preparation of film by means wellknown in the art through extrusion techniques is easily accomplished above the softening points of both phases. Subsequently in the same operation, or at any later time, this film can be cooled (or heated) to a temperature intermediate between the softening points of the two phases, which then permits conventional mono or biaxial orientation process to be conducted. This oriented film is then cooled in the oriented state. To employ this oriented film in a packaging application, all that needs be done is to wrap the article to be packaged within the film, bond the edges in a suitable manner and then expose the film to a temperature intermediate between the two softening points. While biaxial oriented film of certain plastics such as polystyrene and polypropylene are well-known in commerce, the advantages of the two-phase systems of this invention, when conducted in the manner described are: much higher strength of the film at the intermediate temperature permitting an article to be held for very extended times at such elevated temperatures without loss of film integrity, a much decreased sensitivity of the polymer to "melt" temperature when compared to single-phase polymers, and more general ease of application of the process to many polymer systems with a wide variety of physical properties. Numerous other uses for the instant process will be immediately apparent to one skilled in the art.

When thermoplastic ionomers are employed in the practice of the process of the instant invention, certain variations in the processing steps are required. This is necessary since most ionomers have quite high ultimate softening points (i.e., the point above which ionic domains dissociate) and, for some, the softening point is above the thermal decomposition point of the material. Therefore, preferential plasticizers, i.e., plasticizers which primarily relax ionic bonds and therefore disrupt the ionic domains of the ionomer, are employed. In order to be useful in the instant invention, these preferential plasticizers must be dispersible in the ionomer and must be liquid during processing of the ionomer. They must also possess at least one functional constituent which exhibits a bond moment whose absolute value is at least 0.6 and preferably at least 0.7 debyes. This requirement is necessary in order that there be sufficient polarity within the plasticizer molecule to attack the ionomeric cross-linkages. Typical examples of functional constituents which exhibit acceptable bond moments are listed in Table I below. This table is, of course, not meant to be exhaustive, and any functional constituents not shown below which nonetheless have bond moments of at least 0.6 debyes are also useful.

TABLE I

| Unit | | Bond Moment* (Debyes) (Absolute Value) |
|---|---|---|
| C=O | (1) | 2.4 |
| C—O | (1) | 0.86 |
| O—H | (1) | 1.53 |
| N—H | (1) | 1.31 |
| C—Cl | (1) | 1.56 |
| C—F | (1) | 1.51 |
| C—S | (2) | 1.0 |
| C=S | (2) | 2.7 |
| C—Br | (1) | 1.48 |
| SH | (1) | 0.68 |
| NO | (3) | 4.4 |
| C≡N | (1) | 3.6 |
| >O | (4) | ~2.9 |
| P—Cl | (1) | 0.81 |
| S—Cl | (2) | 0.8 |
| Cl—O | (1) | 0.7 |
| P—O | (4) | 2.8 |
| P—S | (4) | 3.2 |
| B—O | (4) | 3.7 |
| S—B | (4) | 3.9 |

(1) C. P. Smythe, J. Phys. Chem., 41, 209 (1937).
(2) C. P. Smythe, J. Am. Chem. Soc., 60, 183 (1938).
(3) E. P. Linton, J. Am. Chem. Soc., 62, 1945 (1940).
(4) G. M. Phillips et al, J. Chem. Soc., 146 (1945).
*C—H bond moment reference point is 0.3.

Within the above description of preferential plasticizers there are two useful types. These will be designated as volatile and nonvolatile plasticizers. The major practical difference between the two is that the nonvolatile plasticizers remain with the final product while the volatile plasticizers are evolved from the ionomer once they have performed their function.

The nonvolatile plasticizers have, in addition to the above-mentioned properties, a melt point or reversible decomposition point which is substantially above the softening point of the thermoplastic backbone (i.e., at least about 10°, and preferably at least about 20° C., above the softening point of the backbone). This melt point should also be in the vicinity of the preselected processing temperature, i.e., at or below the preselected processing temperature.

The nonvolatile preferential plasticizers useful in the instant invention plasticize ionomers only when in the fluid state; they act essentially as fillers at temperatures below their melting points. However, in order for these plasticizers to be useful, they must be readily dispersible in their solid state in the ionomer of interest. It is often helpful, therefore, if the plasticizer contains one or more hydrocarbon moieties. However, it must not be so readily dispersible that it becomes completely molecularly soluble in the ionomer. If this were the case the plasticizer would not retain an independent melt point and would act as a plasticizer at all temperatures.

Typical examples of nonvolatile preferential plasticizers include polar materials containing oxygen, phosphorus or nitrogen atoms. Examples of these plasticizers include compounds such as calcium stearate, zinc laurate, aluminum ricinoleate, lauric acid, benzyl alcohol, resorcinol, distearate ketone, diglycol distearate, dimethylphthalate, nonyl phenol, nonyl phenoxide, triphenylphosphate, tris(3,5-dimethylphenyl) phosphate, diphenylguanidine, piperazine, hydrated salts such as $Li_2SO_4 \cdot H_2O$, etc., alcoholated salts such as $CaCl_2 \cdot (CH_3OH)_4$, etc.

The second type of preferential plasticizer is the volatile plasticizer. This type of agent relaxes the ionic bonds in the system across the range of temperatures from its melting point to its actual boiling point and allows fabrication of the ionomer to take place across the same temperature range. Except for casting from solutions, the boiling point of the volatile plasticizer under the processing conditions employed should be substantially above that of the softening point of the thermoplastic backbone (i.e., at least about 10°, and preferably about 20°, above said softening point). Of course, more volatile preferential plasticizers can be employed when solvent casting processses are used.

Typical examples of volatile preferential plasticizers include water and ethers such as tetrahydrofuran; p-dioxane; diethyl ether; butylphenyl ether; alcohols such as methyl alcohol, isopropyl alcohol, and n-butyl alcohol, etc.; phosphorus containing compound such as tributylphosphate, triisopropylphosphate, etc.; materials containing halogens such as chloroform, bromoform, 1,1,1-trichloroethane, 1-chlorooctane, etc.; materials containing nitrogen such as ethylamine, aniline, dihexylamine, etc.; materials containing sulfur such as 1-butanethiol, etc.

Having set forth the types of plasticizers which may be employed in the process of the instant invention, practice of the process of the instant invention will be discussed employing each type of plasticizer with the thermoplastic ionomer. Volatile plasticizers are employed as follows. A sufficient amount of volatile plasticizer is added to the ionomer, i.e., enough to disrupt the ionic domains of said ionomer. Of course this amount will be dependent upon the mole % of polar groups pendent to the thermoplastic backbone and forming inomeric linkages. However, the amount will normally be in the range of from about 0.1 to about 50, preferably about 0.2 to 20, moles plasticizer per mole of ionic groups. The ionomer containing plasticizer is then heated to a temperature between the softening point of the thermoplastic backbone and the boiling point of the volatile plasticizer. At this temperature the polymer will be in a molten state and may be readily formed in a first desired shape. Thereafter the plasticizer is evolved either by heating the molded article above the boiling point of the plasticizer or by decreasing pressure on the system so as to evolve the plasticizer or by any convenient combination of these techniques. Once the plasticizer has evolved the ionic domains will reform. At this point the formed article may be either cooled below the softening point of the thermoplastic backbone and stored indefinitely or immediately reformed at a temperature above the softening point of the thermoplastic backbone to a second desired shape and then cooled below that softening point while retaining the second desired shape. At any time thereafter the first desired shape may be regained by simply heating the product to a temperature above the softening point of the thermoplastic backbone.

When employing nonvolatile plasticizers, the instant process may be carried out as follows. Sufficient nonvolatile plasticizer having a melting point substantially above the softening point of the thermoplastic backbone is added to the ionomer. By "sufficient" is meant an adequate amount of plasticizer to disrupt the ionic domains of the ionomer. Again, this amount is directly related to the mole % of polar groups pendent to the thermoplastic backbone and forming the ionomeric cross-linkages. Generally, the amount of nonvolatile plasticizer employed is in the range of about 0.1 to about 50, preferably 0.2 to 20, moles per mole of ionic group. Thereafter, the ionomer is heated to a temperature above the melting point of the plasticizer, preferably at least 10° C., and most preferably at least 20° C., above this melting point. At this temperature the plasticized ionomer is in a molten state and may be readily formed in a first desired shape. Thereafter, the formed article is cooled to a temperature between that of the softening point of the thermoplastic backbone and the melting point of the nonvolatile plasticizer. At this temperature the nonvolatile plasticizer solidifies and acts essentially as a filler. It no longer disrupts the ionic domains. The article may then be reformed to a second desired shape and thereafter cooled to a temperature below the softening point of the thermoplastic backbone while retaining the second desired shape. Alternatively, the thermoplastic ionomer after having been formed in the first desired shape may be cooled below both the melting point of the plasticizer and the softening point of the backbone and stored in that manner indefinitely. Thereafter, the article may be reheated to a temperature between the softening point of the backbone and the melting point of the plasticizer and the process continued as shown above.

As in each of the other variations on this process, this article formed to a second desired shape may at any time be heated to a temperature between the softening point of the thermoplastic backbone and the melting point of the plasticizer in order to regain the first desired shape.

The following examples are presented to further illustrate the process of the instant invention.

EXAMPLE 1

Formation of TBS-S-TBS Block Polymer — ABA Type

A sample of a t-butylstyrene-styrene-t-butylstyrene (TBS-S-TBS) block copolymer of the ABA type was prepared as follows. A one liter flask was oven dried, attached to a vacuum line and evacuated to 0.2 mm mercury pressure for 20 min. at about 150° C. to effectively remove trace amounts of moisture. The flask was cooled and 500 ml of pure dry benzene was added. To the benzene was added 14.89 ml of 0.1344N n-butyllithium in heptane. The reaction temperature was maintained at about 50° C., and 35.5 grams of purified dry t-butylstyrene was added to the solution. The colorless solution quickly turned bright orange and the temperature rose 5 to 10° C. due to the heat of polymerization. The reaction was permitted to stir for 30 min. at 65° C. The reaction vessel was then cooled to about 50° C. and 163.1 gms of styrene was added and stirring was effected for 45 min. Some cooling of the reaction flask was necessary to prevent overheating of the reaction. Then 35.4 grams of t-butylstyrene was added at 60° C. and the entire contents were stirred at 60° to 70° C. for 40 min. The contents of the flask were then precipitated in methanol (a large excess of several liters), ground up in a high speed blender, filtered, and dried in a vacuum oven at 80° C. overnight. The final yield was 234 grams, which is about quantitative. The number average molecular weight of the final polymer chain is estimated to be 116,700. The first t-butylstyrene block is estimated to be 17,700 in number average molecular weight, the center styrene block is estimated to be 81,400 in number average molecular weight, and the third block of t- butylstyrene is estimated to be 17,600 in number average molecular weight. The softening points in the blocks of these polymers are somewhat dependent on the method of measuring. Using a duPont Thermo Mechanical Analyzer (TMA) 2 softening points were observed with this polymer, one near 100° C. for the polystyrene block, and one near 140° C. for the poly-t-butylstyrene block. (Heating rate of 10° C/min. with 5 gram weight on probe). The softening point of high molecular weight polystyrene homopolymer is estimated to be 100° to 110° C., while for poly-t-butylstyrene homopolymer the softening point is estimated at 140° to 150° C. Gel permeation chromatography demonstrated the essential absence of either homopolymer or diblock polymers.

Formation of TBS-S Block Polymer

Using the procedure described above a two block copolymer containing approximately 70% styrene was prepared by charging in 1000 ml benzene containing 11.09 ml of 0.1108 N n-butyllithium in heptane, 142.7 gms pure, dry styrene, then after about 30 min. 59.9 gms of pure dry t-butylstyrene was added. The polymerization was conducted for about 1 additional hour and worked up as above. The number average molecular weight of the polymer is estimated to be 164,500, with the styrene block estimated to be 116,200 and the t-butylstyrene block estimated at 48,300. The intrinsic viscosity in toluene at 25° C. is 0.61. Gel permeation chromatography measurements demonstrated the essential absence of homopolymer contamination.

Formation of S-TBS-S Block Polymer — BAB Type

Using the same procedure outlined above 11.14 ml of 0.1108 N - n-butyllithium was added to 1000 ml benzene followed by 69.7 gms styrene which was polymerized, followed by 60.1 gms t-butylstyrene which was polymerized, followed by 70.1 gms styrene which was polymerized. The reaction mixture was worked up as above. The various block molecular weights were estimated at 55,700, 48,100, and 56,500 and the number average molecular weight of the product was estimated at 160,300. The intrinsic viscosity in toluene at 25° C. was 0.68. The final styrene composition was about 70% distributed equally at the ends of the polymer molecule, and 30% t-butylstyrene as the center block. Gel permeation chromatography demonstrated the essential absence of either homopolymer or diblock copolymer.

EXAMPLE 2

Comparative tests were run comparing the three block TBS-S-TBS copolymer (ABA type) with the two block TBS-S copolymer (AB type), and the three block S-TBS-S copolymer (BAB type) of Example 1 and with polystyrene homopolymer. The results of these tests demonstrate the necessity for employing multiphase copolymers having the structural arrangements set out heretofore and the inapplicability of a two block multiphase system in the process of the instant invention.

The four polymers were investigated on an Instron rheometer at 120° C. to determine tensile strength at yield, tensile strength at break, and elongation; which are indications of "melt" strength of the system.

The polystyrene sample behaved as a very viscous melt; i.e., exhibited no yield strength, no breaking point and just continuous stretching of the sample.

The results for the respective block copolymers were as follows:

| 3-Block - ABA Type | | | |
|---|---|---|---|
| Yield Point | | Break Point | |
| Strength (psi) | Elongation (%) | Strength (psi) | Elongation (%) |
| 303 | 13 | 381 | 437 |
| 237 | 14 | 427 | 405 |
| 221 | — | 303 | 453 |
| Average 253 | 13.5 | 371 | 432 |

| 2-Block | | | |
|---|---|---|---|
| Yield Point | | Break Point | |
| Strength (psi) | Elongation (%) | Strength (psi) | Elongation (%) |
| 338 | 16 | 161 | 320 |
| 315 | 11 | 115 | 330 |
| Average 326 | 13.5 | 138 | 330 |

| 3-Block - BAB Type | | | |
|---|---|---|---|
| Yield Point | | Break Point | |
| Strength (psi) | Elongation (%) | Strength (psi) | Elongation (%) |
| 1356 | 2.7 | 689 | 261 |
| 1448 | 2.7 | 643 | 195 |
| Average 1402 | 2.7 | 666 | 228 |

The significance of these results is as follows. The polystyrene homopolymer possessed essentially no significant strength above its melting point. Aside from polymer chain entanglement there were no forces which resisted the flow of polymer chains past each other; therefore, there was no restoring force active to provide a memory of the original shape. A quantitative measure of the restoring forces within a polymer can be provided by stress-strain relationships such as those obtained on an Instron testing machine. (Some representative examples of stress-strain curves for a number of different polymers are found in *Testing of Polymers*, Vol. I, Ed. by J. V. Schmitz, Interscience Publishers, p. 91,92.) The tensile stress of a polymer measured under these conditions is reflective of the restoring forces within a polymer sample. If the sample has insufficient restoring forces, then the stress will diminish with increasing strain. By contrast, in order to provide a polymer with a memory at a given temperature, the stress (or tensile strength) at high strain should be higher than at low strain. This is the desirable characteristic for a material to restore its initial shape on distortion.

It is also apparent that if a polymer is subjected to deformation beyond the stress which it provides at break, then the chemical or physical bonds holding it together will rupture and, in this event, a product will lose its capability to recover.

With this background, the significance of the stress-strain results for the 3 block TBS-S-TBS block copolymer may be shown. At low strain (or elongation) the polymer possesses a yield point of moderate stress, but on continued strain the strength (stress) continues to rise until the sample breaks. This increase in stress with increasing strain is a clear manifestation of physical association acting as crosslinks to restore the initial shape.

In the case of the 2-block system, after the moderate stress at low strain (elongation of 10–15%) the tensile strength (stress) then diminished substantially until the sample broke. This indicates that the styrene chains are essentially tied down in a rigid TBS domain (at 120° C.) only at one end and this permits the polymer chains to flow by each other much more readily than in the 3 block system. Such flow diminishes the restoring forces and makes such 2 block systems unsatisfactory in this invention.

These data demonstrate that a 3 block system is much preferred over a 2 block copolymer. While the 2 block system is considerably superior to the single phase homopolymer, we require the maximum restoring forces possible in order to preserve the integrity of domains at high temperatures and to promote the reversibility of the fabrication process.

The results for the stress-strain behavior of a 3 block system of the BAB type (S-TBS-S) bear out the statements that the center block must be the lower softening one to achieve the memory characteristics and fabrication behavior required for the process of the instant invention. Again it can be seen that the tensile strength or stress of this sample (with a high softening center block) at yield is higher than at the break point. This is typical of a plastic (and nonrecoverable) stress-strain curve. In all cases where this behavior is obtained there will be an irreversible deformation and the memory characteristics of the deformed object will be lost.

EXAMPLE 3

Reversible Compaction of Rigid Foam 5.0 gmms of the block copolymer prepared in Example 1 was combined in powdered form with 0.5 gm NaHCO$_3$ and placed in a plunger type mold with a 1/16 inch orifice drilled in the side to permit extrusion of a molten plastic rod when pressure is applied to the hot mole. The entire mold was heated to 380 F. (193° C.) and extruded under 1 ton pressure in a Carver Laboratory Press. The resulting extruded rod foamed as it left the orifice and extruded to about 1/10 inch in diameter. It was white, and microscopic examination showed it to be truly foamed. Density measurements showed a density of 0.5 gms/cc.

A small piece of this foamed rod was measured to yield the following dimensions:
length: 1.0 inches
diameter: 0.095 inches This small cylinder was placed in a 130° C. forced air oven for 10 minutes, then removed and placed between 2 preheated flat platens at about 135° to 140° C. (275° to 285° F.) (a temperature between the softening points of the blocks) for 10 minutes at 1000 psi (indicated pressure) on a laboratory press. Two thin sheets of Mylar film (biaxially oriented polyethylene-terephthalate) were used to prevent metal contact with the sample. The sample was then cooled in the compressed state. The final dimensions of the molded and cooled piece were:
lenth: 1.06 inches
width: 0.20 inches
thickness: 0.020 inches This was a clear thin plaque except for some particles of inorganic agent still observable. The strength appeared good with no obvious bubbles.

This same sample was placed in an open mold large enough to permit it to reexpand and the mold was placed back between the platens at 135° to 140° C. for 30 minutes with no pressure. At the end of that time it was observed that the pressed plaque nearly regained the original dimensions:
length: 0.835 inches
diameter: 0.094 inches in 1 direction
diameter: 0.066 inches in another direction This Example demonstrates molding of aa multiphase block copolymer according to the process of the instant invention. It also demonstrates that the first attained shape (i.e. the rigid foam) may be readily recreated by simple heating.

EXAMPLE 4

Fabrication of Elastic Plastic Springs

This Example was designed to demonstrate the advantages of fabricating a multiphase block copolymer in an intricate form such as a coiled spring. A sample of (TBS-S-TBS) block copolymer of Example 1 was extruded and oriented at a temperature near 200° C. (this sample was not foamed). The monofiament was then cooled to room temperature. An aluminum rod ¼ inch in diameter was then wound with this length of plastic at room temperature and the ends of the plastic rod were securely attached with copper wire. This entire device was placed in a forced air oven at 135° to 140° C. for 1½ hrs. and then cooled. This temperature was selected as being intermediate between the softening points of the two phases. When removed from the aluminum rod a coiled plastic spring was obtained which retained the exact contours of the rod and appeared to have excellent elastic properties.

One attempt was made to do the same with a single phase polymer, specifically polystyrene. when this polymer winding was placed in the oven, the plastic softened, broke in several places an also "melted" together. This Example demonstrated that ABA type glass-glass block copolymers, crystal-glass systems, rigid ionically associated polymer, and other systems obeying the criteria previously stated can be fabricated into useful shapes by manipulation at $T_M$ (i.e., a temperature between the softening points of the blocks or between the softening point of the thermoplastic backbone and the point of disruption of the ionic domains).

EXAMPLE 5

A sample of (TBS-S-TBS) block copolymer of Example 1 is extruded and oriented at a temperature near 200° C. The monofilament of about 2 mm in diameter is cooled to 135° C. in a suitably heated environment (oven) and in this rubbery state it is wrapped around an aluminum rod ¼ inch in diameter. This temperature is intermediate between the softening points of the two phases. When sufficient filament is coiled to provide the proper length spring (about 10 cm) the filament is cut and the coiled filament and rod cooled below 100° C. The elastic spring is now removed from the rod and found to have excellent elastomeric properties and to retain its configuration. This process can be conducted in a continuous manner if desired.

EXAMPLE 6

A sample of polystyrene was sulfonated and neutralize to yield the sodium salt with the following procedure:

Sulfonation of Polystyrene by 1:1 (EtO)$_3$PO - SO$_3$ Complex

| | |
|---|---|
| Sulfonation Complex: | 10.4 ml of (EtO)$_3$PO and 2.55 ml of SO$_3$ contained in 87 ml of CH$_2$Cl$_2$. |
| Polymer Employed: | 50 gms of polystyrene homopolymer of Intrinsic Viscosity 0.8. |

To a stirred solution of the polymer in 500 ml of CH$_2$Cl$_2$ was added a solution of the complex. The color of the mixture turned yellow, it was allowed to stand for 3 hrs. heated at reflux for 2 hrs. The polymer was precipitated by steam stripping, finely divided in a high speed blender in water, filtered, washed well with additional water, methanol, and air dried. A portion after thorough drying was substituted for sulfur analysis. Found: S:0.70% (based on this analysis, about 1.80% of the styrene units have reacted to be substituted by sulfonic acid groups).

The remainder of the sulfonated polymer was suspended in 600 ml of benzene and 5 ml of MeOH. The resulting white emulsion was neutralized with 8.1 ml of 1.25W NaOH solution. It was precipitated again by steam stripping. The resulting solid polymer was worked up as above; the yield was 42 g. A sample of this sulfonated plastic was foamed into a rigid, tough microcellular foam with an estimated density of 0.4 gms/cc.

A portion of this foam was separated from the sample and the thickness of this sample measured to be 0.168 inches thick. This sample was placed between the platens of an electric press controlled at 285° F., and subjected to an indicated pressure of 1000 psi for 10 minutes. The sample was then cooled under pressure. The thickness after cooling was found to be 0.025 inches or about 15% of the original thickness. The sample appeared clear, rigid and reasonable tough.

The compacted sample was then placed back between the platens at 285° F. with sufficient space to expand without pressure for ½ hour. The foamed appearance of the original material was reacheived. After cooling the thickness was found to be 0.138 inch, nearly equal to that of that of the starting material. In every respect the appearance of the final foamed ionic plastic appeared comparable to that of the initial foamed product.

EXAMPLE 7

The three copolymers described in Example 1 (TBS-S-TBS), (S-TBS), and (S-TBS-S) all containing about 70% styrene were foamed to create cellular foams with estimated foam densities of about 0.3 gms/cc. Sections of each of these foamed materials were removed and the thickness measured with an accurate thickness gauge. Then the foams were simultaneously subjected to temperatures of about 275° to 280° F., between the platens of an electric press with thin sheets of Mylar film (a biaxially oriented polyethylene terephthalate) to prevent sticking and after 10 minutes to permit thermal equilibrium, the samples were exposed to 2000 psi indicated platen pressure. This high pressure believed to be greater than the tensile strength of the polymers at these temperatures; however, even under these conditions there should be sufficient restoring forces in the samples to provide a certain proportion of recovery. The percent recovery of these 3 samples should provide a quantitative measure of the restoring forces — remaining after compaction.

The samples were cooled under pressure, and measured, then placed back between the platens at 285° to 295° F. without pressure. After 30 minutes of exposure to this higher temperature the thickness of the samples was reexamined. The findings are presented below.

| Sample | Initial Thickness | Thickness After Compaction | Final Thickness | (a) % Recovery |
| --- | --- | --- | --- | --- |
| TBS-S-TBS | 0.136 | 0.030 | 0.070 | 52 |
| S-TBS | 0.239 | 0.036 | 0.045 | 19 |
| S-TBS-S | 0.165 | 0.020 | 0.035 | 21 |

-continued

| Sample | Initial Thickness | Thickness After Compaction | Final Thickness | (a) % Recovery |
| --- | --- | --- | --- | --- |

(a) % Recovery is expressed as $\left(\frac{\text{Final Thickness}}{\text{Initial Thickness}} \times 100\right)$ This experiment demonstrates that even under conditions where partial destruction of the bonds would be expected (due to chemical bond breakage or disruption of the physical association) there is a very substantial recovery in the TBS-S-TBS case. Clearly, inthe case of the 2 block system recovery is substantially less; similarly, the 3 block system with the higher softening center block recovers only a minor portion of the initial shape.

Of course, if one is to achieve nearly quantitative recovery, the forces on the polymer sample should be such that at a given temperature they do not exceed the tensile strength of the particular sample at break. While this is often difficult to determine from theory, a few experments should quickly define the proper temperature and pressure condition for optimal recovery.

EXAMPLE 8

Preparation and Fabrication of a Seven Block t-Butylstyrene-Styrene Copolymer

10TBS-20S-10TBS-20S-10TBS-20S-10TBS

Under anaerobic and anhydrous conditions 400 ml of purified benzene is charged to a polymerization vessel followed by 0.53 milliequivalents of n-butyllithium in heptane. t-Butylstyrene (9.0 g, 0.056 mole) is added at about 30° C., and the resultant solution is stirred 15–30 minutes at 30°–60° C. Six more monomer additions are made as follows: styrene (18.0 g, 0.173 mole), t-butylstyrene (9.0 g), styrene (18.0 g), t-butylstyrene (9.0 g), styrene (18.0 g), and t-butylstyrene (9.0 g). Between additions the solution is permitted to stir for 15–30 minutes at 30°–60° C. The polymerization solution is then inactivated by the addition of a small quantity of methanol, and the seven block copolymer is isolated by precipitation with methanol in a Waring blender. The precipitated block copolymer is thoroughly washed with methanol and vacuum oven dried at 80° C. for 24 hours. A quantitative yield (90 g) of block copolymer is obtained. Gel permeation chromatography shows the copolymer to possess a narrow molecular weight distribution. A molded film of the block copolymer is clear and transparent. The calculated degree of polymerization of the seven block copolymer is 1400, and the calculated molecular weight is 170,000.

A sheet about 0.020 inches thick is prepared by molding of this copolymer at 180° C. This sheet is then cooled to about 130° C. and quickly stamped in a female mold of intricate design which is at room temperature. After a minute the sheet is removed and found to reproduce the mold impression with excellent detail.

EXAMPLE 9

Preparation and Fabrication of an (AB)$_n$ Block Copolymer:

Poly(ethylene oxide) - Polystyrene

A block of polystyrene terminated on each end by hydroxyl groups is prepared by the polymerization of pure dry styrene with sodium naphthalene as initiator in a suitable solvent such as tetrahydrofuran, followed by the addition of styrene oxide. About 32 gms of styrene is added to 600 ml of tetrahydrofuran solution containing 25.0 mmoles of sodium naphthalene under anhydrous and anaerobic conditions with vigorous stirring. After several minutes, about 20 gms of styrene oxide is added, stirred for 15 minutes, and the entire reaction mixture is terminated by the addition of 5 ml of methanol. The polymer is recovered by precipitation in a large excess of alcohol and dried. The number average molecular weight is found to be 3100.

To prepare the block copolymer 2.53 parts polyethylene oxide of 5650 molecular weight is reacted with 0.225 parts of 4,4'diphenylmethane diisocyanate by adding the two components to 17 parts of benzene with 0.013 parts triethylenediamine present as catalyst. After 30 minutes reaction time 1.41 parts of dihydroxyl polystyrene of 3100 molecular weight is added, and the entire reaction mixture is heated at 50° C. for 48 hours. The polymer is isolated by evaporation of the benzene. A high molecular weight polymer with a number average molecular weight greater than 40,000 is obtained. Two softening points are observed for this polymer (about 55° C. and about 90° C.). When molded at 130° C. and cooled a clear, tough sheet results. When heated to 70° C. the sheet is stamped quickly into a cold female mold of intricate design. The mold impressions are reproduced with excellent detail.

EXAMPLE 10

Example of a Sulfonated Polyethylene

An ethylene-2-ehtylidene-5-norbornene copolymer is prepared as follows: 300 ml of dry n-heptane is added to a suitable reaction flask and cooled with an ice-water mixture. The ethylidene norbornene (0.50 gms) is added into the heptane, and the solution is saturated with pure ethylene previously dried by passing through two towers filled with $P_2O_5$ and $CaCl_2$. To this reaction mixture is added a solution containing 15 mmoles of diethyl aluminum chloride in 30 ml of heptane and a second solution containing 3 mmoles of $VOCl_3$ in 15 ml of heptane. The addition of ethylene monomer is now continued at a rate equal to that reacted (i.e., the feed rate of the ethylene is monitored such that there is no ethylene blow-off). For every 5 liters of ethylene feed, an additional 1 gm of ethylidenenorbornene is added. After a total of 1 hour the reaction is terminated by adding about 10 ml of isopropanol, and the product is isolated by precipitation into 1 liter of isopropanol containing 0.5 gms of phenyl-beta-naphthylamine. The product weight is about 30 gms.

To a vigorously stirred suspension of 30 g. of ethylene-ethylidene-norbornene copolymer in 300 ml of dichloroethane is added 100 ml of 1:1 triethyl phosphate:sulfur trioxide complex in dichloroethane containing 15.6 ml of triethylphosphate, 3.82 ml of sulfur trioxide, and 81.6 ml of dichloroethane. After allowing to stir for 5 hrs., the solid is collected by filtration, washed well with methylene chloride followed by methanol.

The sulfonated polymer thus obtained is suspended in 500 ml of methanol and is neutralized with 1.25 N caustic soda solution to phenolphthalein end point. The solid is collected, washed well with hot water (70° C.) methanol, and dried to give the desired sodium sulfonate of the polymer.

The sulfonated polyethylene is not readily molded at 200° C. and 1000 psi without the incorporation of a polar plasticizer. The sulfonated polyethylene (5 parts) is dissolved in 50 parts of p-xylene containing 1 part of cyclohexanol and a film is cast by heating the solution at an elevated temperature (100° to 130° C.). When substantially dry, the tough flexible film is further dried for 24 hours under high vacuum at 100° C. to remove the last traces of volatile alcohol. The tough film is now heated to 150° C. and then rapidly stamped into a female metal mold having an intricate mold design (held at room temperature) and removed ater 10 seconds. It is observed that the polyethylene sheet retains the impression of the old with excellent detail. If it is desired to remove this impression, the polyethylene sheet is reheated to 150° C.

Although the above examples adequately illustrate the instant invention, it should be understood that the invention is in no way meant to be limited thereby. The invention is limited only by the claims which follow.

What is claimed is:

1. A process for fabricating an article from a thermoplastic composition, said thermoplastic composition being a multiphase copolymer of the A-B-A,

or $(AB)_n$ type, wherein $n$ is greater than 1 and wherein polymer blocks, A and B, are thermoplastic resins, each comprising at least 10 monomer units and having softening points of at least 35° C., with B being the lower softening block and being present in at least about 50% to about 97% by weight % of the total polymer, and the A block having a softening point at least 10° C. higher than said B block which comprises:
   a. forming said thermoplastic composition in a first desired shape at a temperature above both softening points;
   b. reforming to a second desired shape the formed thermoplastic of step (a) at a temperature between that of the softening point of the A and B blocks; and
   c. cooling the reformed thermoplastic to a temperature below both softening points while retaining said new desired shape.

2. The process of claim 1 wherein prior to step (b) the formed thermoplastic is cooled to a temperature below that of both softening points and thereafter heated to the temperature required by step (b).

3. The process of claim 1 wherein the thermoplastic is a poly-t-butylstyrene-polystyrene block copolymer.

4. The process of claim 3 wherein the block polymer is of the ABA type.

5. The process of claim 1 wherein each polymer block contains at least 50 monomer units.

6. The process of claim 1 wherein step (a) is performed at a temperature at least 10° C. above that of the softening point of the A block.

7. The process of claim 1 which comprises the additional step of reheating the cooled thermoplastic of step (c) to a temperature between that of the softening points of the A and B blocks, thereby reachieving said first desired shape.